(12) United States Patent
Chae et al.

(10) Patent No.: US 11,114,114 B2
(45) Date of Patent: *Sep. 7, 2021

(54) VOICE INTERPRETATION DEVICE

(71) Applicant: LG ELECTRONICS INC., Seoul (KR)

(72) Inventors: Jonghoon Chae, Seoul (KR); Juyeong Jang, Seoul (KR); Yongchul Park, Seoul (KR); Siyoung Yang, Seoul (KR); Sungmin Han, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/850,810

(22) Filed: Apr. 16, 2020

(65) Prior Publication Data

US 2020/0243106 A1    Jul. 30, 2020

Related U.S. Application Data

(63) Continuation of application No. 16/151,091, filed on Oct. 3, 2018, now Pat. No. 10,692,517.

(30) Foreign Application Priority Data

Aug. 3, 2018 (KR) .................. 10-2018-0090581

(51) Int. Cl.
*G10L 13/00* (2006.01)
*G10L 25/69* (2013.01)
(Continued)

(52) U.S. Cl.
CPC .............. *G10L 25/69* (2013.01); *G10L 15/02* (2013.01); *G10L 17/26* (2013.01); *G10L 19/02* (2013.01);
(Continued)

(58) Field of Classification Search
None
See application file for complete search history.

(56) References Cited

U.S. PATENT DOCUMENTS 8,380,503 B2   2/2013   Gross
8,494,854 B2   7/2013   Gross
(Continued)

FOREIGN PATENT DOCUMENTS

JP    2001265387     9/2001
KR    100477980      3/2005
KR    20080023030    3/2008

OTHER PUBLICATIONS

PCT International Application No. PCT/KR2018/011833, Written Opinion of the International Searching Authority dated May 3, 2019, 8 pages.
(Continued)

*Primary Examiner* — Satwant K Singh
(74) *Attorney, Agent, or Firm* — Lee, Hong, Degerman, Kang & Waimey

(57) ABSTRACT

An apparatus that includes a microphone and a processor. The processor is configured to receive, via the microphone, audio comprising voice of a person, and determine whether the received audio is an actual voice or a synthesized voice. The apparatus also provides a first notification indicating that the received audio is the actual voice when the received audio is the actual voice, and provides a second notification indicating that the received audio is the synthesized voice when the received audio is the synthesized voice.

13 Claims, 12 Drawing Sheets

(51) Int. Cl.
*G10L 19/02* (2013.01)
*G10L 17/26* (2013.01)
*G10L 15/02* (2006.01)
*G10L 25/18* (2013.01)
*G10L 15/22* (2006.01)

(52) U.S. Cl.
CPC ........ *G10L 25/18* (2013.01); *G10L 2015/226* (2013.01)

(56) References Cited

U.S. PATENT DOCUMENTS

| | | |
|---|---|---|
| 8,744,850 B2 | 6/2014 | Gross |
| 8,868,423 B2 | 10/2014 | Gross |
| 8,949,126 B2 | 2/2015 | Gross |
| 9,075,977 B2 | 7/2015 | Gross |
| 9,558,337 B2 | 1/2017 | Gross |
| 9,653,068 B2 | 5/2017 | Gross |
| 9,865,253 B1 | 1/2018 | De Leon et al. |
| 10,013,972 B2 | 7/2018 | Gross |
| 10,276,152 B2 | 4/2019 | Gross |
| 10,692,517 B2 * | 6/2020 | Chae .................. G10L 25/51 |
| 2009/0055193 A1 | 2/2009 | Maislos et al. |
| 2009/0259468 A1 | 10/2009 | Schroeter |
| 2009/0319274 A1 | 12/2009 | Gross |
| 2020/0043515 A1 | 2/2020 | Chae et al. |

OTHER PUBLICATIONS

Korean Intellectual Property Office Application No. 10-2018-0090581, Office Action dated Dec. 3, 2019, 39 pages.

U.S. Appl. No. 16/151,091, Office Action dated Nov. 18, 2019, 10 pages.

U.S. Appl. No. 16/151,091, Notice of Allowance dated Mar. 10, 2020, 11 pages.

* cited by examiner

FIG. 7

| VOCODER FEATURE |
|---|
| TRACE OF THE SAME PULSE AS SYNTHESIZED VOICE IN VOICED REGION |
| TRACE OF RANDOM NOISE IN UNVOICED REGION |
| CHANGE IN BASIC PHONEME PERIOD |
| ASPECT OF VOCAL TRACT COEFFICIENT |
| ⋮ |

VOICE INTERPRETATION DEVICE

CROSS-REFERENCE TO RELATED APPLICATIONS

This application is a continuation of U.S. patent application Ser. No. 16/151,091, filed on Oct. 3, 2018, which claims the benefit of earlier filing date and right of priority to Korean Application No. 10-2018-0090581, filed on Aug. 3, 2018, the contents of which are hereby incorporated by reference herein in their entirety.

FIELD OF THE INVENTION

The present invention relates to a voice interpretation device, and more particularly, to a voice interpretation device capable of distinguishing between actual voice of a user and synthesized voice.

DISCUSSION OF THE RELATED ART

Among many voice synthesis methods, a synthesis method of selecting voice units as a pronunciation unit from a voice database and connecting the voice units is widely used. Such synthesis methods may synthesize pronunciation units into a desired person's voice. However, performing an authentication process of a terminal through synthesis of a person's voice raises security vulnerabilities.

Korean Patent Laid-Open Publication No. 10-2015-0035312 provides discussion that if sound information input to a user equipment is a person's voice, converted text is generated based on the sound information and is compared with reference text, thereby determining whether the user equipment is unlocked or not. In Korean Patent Laid-Open Publication No. 10-2015-0035312, since unlocking is determined based on text, unlocking may be performed through another person' voice.

In addition, Korean Patent Laid-Open Publication No. 10-2000-0044409 discloses a method of locking and unlocking a mobile phone terminal using voice, which compares input voice with a registered voice locking message and unlocks the terminal if the input voice is equal to the registered voice locking message. However, in this method, since the terminal can be unlocked using text, another person may unlock the terminal.

SUMMARY

One feature presented herein provides a voice interpretation device capable of distinguishing synthesized voice from actual voice using differences between synthesized voice and the actual voice of a person.

One embodiment includes a voice interpretation device including an output unit, a microphone configured to receive voice from an outside and a processor configured to determine whether the received voice is actual voice of a user or synthesized voice, to output a first notification indicating that the received voice is the actual voice through the output unit if the received voice is the actual voice, and to output a second notification indicating that the received voice is the synthesized voice through the output unit if the received voice is the synthesized voice.

Another embodiment includes an apparatus having a microphone and a processor. The processor is configured to receive, via the microphone, audio comprising voice of a person, and determine whether the received audio is an actual voice or a synthesized voice. The apparatus also provides a first notification indicating that the received audio is the actual voice when the received audio is the actual voice, and provides a second notification indicating that the received audio is the synthesized voice when the received audio is the synthesized voice.

Additional scope of applicability of the present invention will become apparent from the following detailed description. It should be understood, however, that since various changes and modifications within the spirit and scope of the invention will be apparent to those skilled in the art, the detailed description and specific examples, such as the preferred embodiments of the invention, are given by way of illustration only.

According to the embodiment of the present invention, it is possible to efficiently distinguish fake voice according to artificial intelligence based voice synthesis. It is further possible to enhance security of the terminal, by distinguishing between the actual voice of the user and the synthesized voice and rejecting authentication of the synthesized voice.

BRIEF DESCRIPTION OF THE DRAWINGS

FIG. 7 illustrates vocoder feature information according to an embodiment of the present invention.

DETAILED DESCRIPTION

Figure 1:
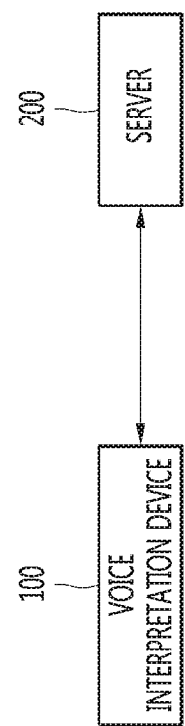
FIG. 1 is a block diagram showing a voice interpretation system according to an embodiment of the present invention.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that if an element is referred to as being "connected with" another element, the element can be directly connected with the other element or intervening elements may also be present. In contrast, if an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

The voice interpretation device presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra-books, wearable devices (for example, smart watches, smart glasses, head mounted displays (HMDs)), and the like.

By way of non-limiting example only, further description will be made with reference to particular types of terminals. However, such teachings apply equally to other types of terminals, such as those types noted herein. In addition, these teachings may also be applied to stationary terminals such as digital TV, desktop computers, and the like.

FIG. 1 is a block diagram showing a voice interpretation system according to an embodiment of the present invention. The voice interpretation system shown in this figure includes a voice interpretation device 100 and a server 200. The voice interpretation device 100 may determine whether voice that is received as input is an actual voice of a user or synthesized voice. The server 200 may perform communication with the voice interpretation device 100 and transmit, to the voice interpretation device 100, or other device, information serving as a criterion for determining whether input voice is actual voice or synthesized voice.

Figure 2:
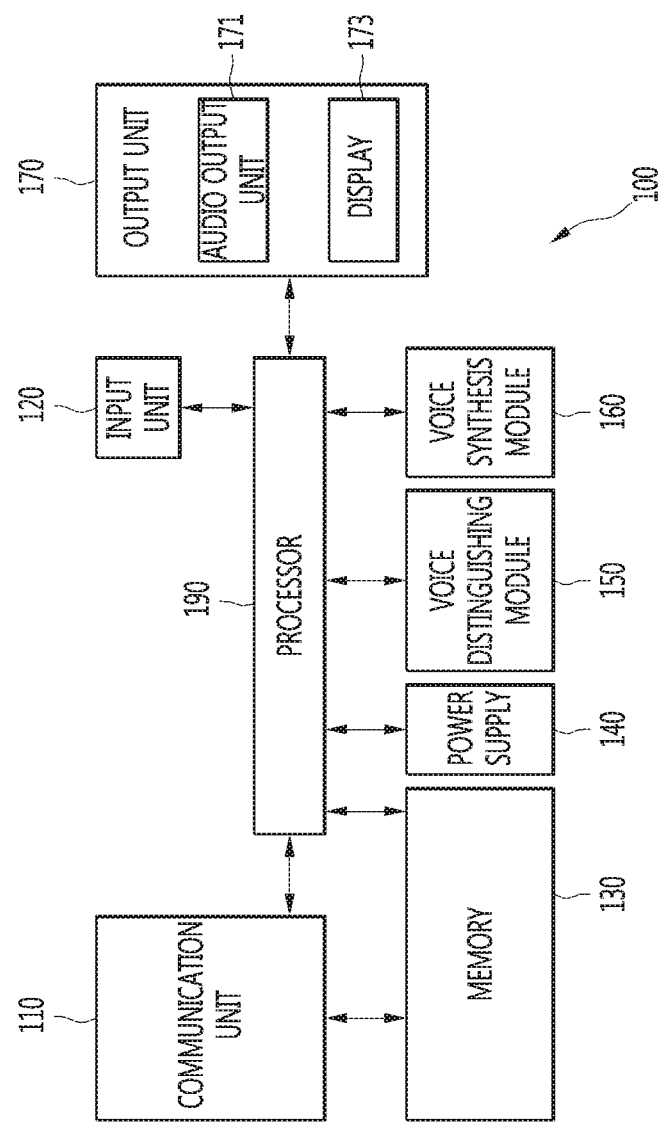
FIG. 2 is a block diagram showing a voice interpretation device according to an embodiment of the present invention.

FIG. 2 is a block diagram showing a voice interpretation device according to an embodiment of the present invention. This figure shows voice interpretation device 100 having a communication unit 110, an input unit 120, a memory 130, a power supply 140, a voice distinguishing module 150, a voice synthesis module 160, an output unit 170 and a processor 190.

The communication unit 110 communicates with other entities, such as the server 200, and may receive information for distinguishing between the actual voice and the synthesized voice, from the server 200 (or other entity).

The input unit 120 may receive voice from the outside the device and may include one or more microphones to receive such voice. The memory 130 is generally configured to store information for distinguishing between the actual voice and the synthesized voice.

The power supply 140 may supply power to the voice interpretation device 100. The voice distinguishing module 150 may determine whether voice input to the input unit 120 is an actual voice of a user or synthesized voice. If the voice input to the input unit 120 is actual voice, the voice synthesis module 160 may generate synthesized sound indicating that the voice input to the input unit 120 is actual voice and send the synthesized sound to the output unit 170. On the other hand, if the voice input to the input unit 120 is synthesized voice, the voice synthesis module 160 may generate synthesized sound indicating that the voice input to the input unit 120 is synthesized voice and send the synthesized sound to the output unit 170.

The output unit 170 is shown having an audio output unit 171 and a display 173. The audio output unit 171 may output the synthesized sound indicating that the voice input to the input unit 120 is the actual voice or the synthesized voice. The display 173 may display text indicating that the voice input to the input unit 120 is the actual voice or the synthesized voice.

The processor 190 may control overall operation of the voice interpretation device 100, and may also determine whether acquired voice is actual voice or synthesized voice. If the acquired voice is actual voice, the processor 190 may perform an authentication procedure according to the received actual voice. The processor 190 may output a notification indicating that authentication has been performed using the actual voice through the output unit 170, after the authentication procedure.

If the acquired voice is not the actual voice, the processor 190 may determine that the acquired voice is the acquired voice and reject authentication. The processor 190 may output a notification indicating that the acquired voice is the synthesized voice through the output unit 170 according to an authentication rejection.

Although the voice distinguishing module 150 and the voice synthesis module 160 are shown configured independently of the processor 190 in FIG. 2, this is merely exemplary and some or all of the functionality of voice distinguishing module 150 and the voice synthesis module 160 may be performed by processor 190.

Figure 3:
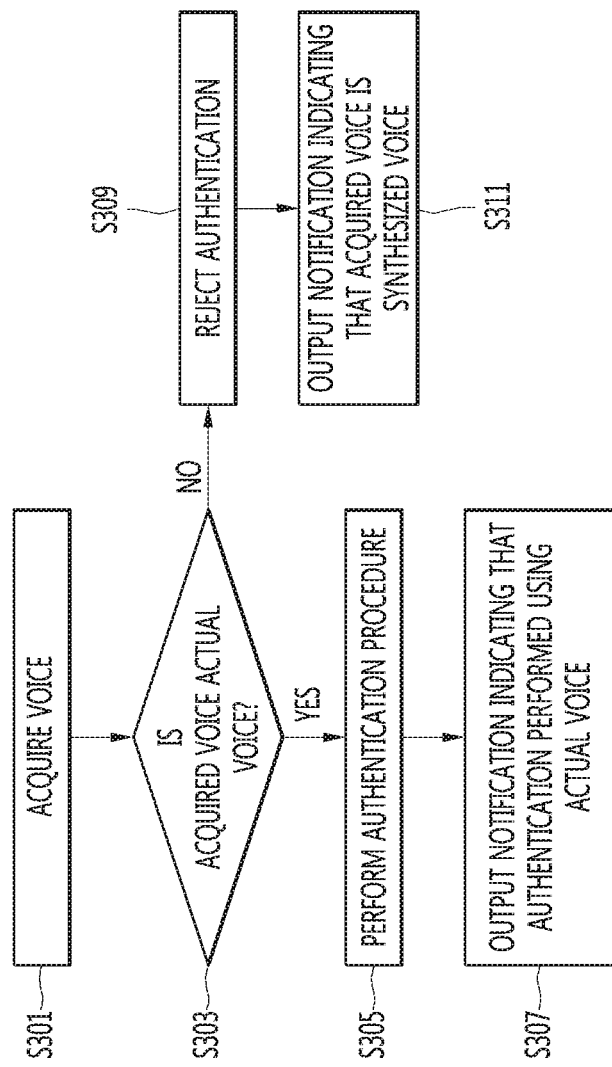
FIG. 3 is a flowchart illustrating a method of operating a voice interpretation device according to an embodiment of the present invention.

FIG. 3 is a flowchart illustrating a method of operating a voice interpretation device according to an embodiment of the present invention.

Referring to FIG. 3, the input unit 120 of the voice interpretation device 100 acquires voice for disabling security from the outside (S301). Voice for disabling security may be sound for unlocking the voice interpretation device 100. The processor 190 of the voice interpretation device 100 determines whether the acquired voice is actual voice (S303).

In one embodiment, the acquired voice may represent voice directly uttered by a person (e.g., a user), or it may be synthesized voice that is not voice directly uttered by the user, and thus, may be voice obtained by acquiring and synthesizing recorded voice of another user's voice. In block S303, the processor 190 may determine whether the acquired voice is actual voice or synthesized voice, based on a difference model of the actual voice and the synthesized voice.

In one embodiment, the difference model of the actual voice and the synthesized voice may be stored in the memory 130 of the voice interpretation device 100. The difference model of the actual voice and the synthesized voice may include power spectrum information corresponding to actual voice, power spectrum information corresponding to the synthesized voice and a vocoder feature information of the synthesized voice. Specifically, the processor 190 may determine whether the voice is synthesized voice or actual voice using the power spectrum of the acquired voice.

As another example, the processor 190 may determine whether the voice is synthesized voice or actual voice using the vocoder feature information of the acquired voice. In one embodiment, the difference model of the actual voice and the synthesized voice may be generated by the server 200 and transmitted to the voice interpretation device 100. Alternatively, the difference model of the actual voice and the synthesized voice may be generated by the voice interpretation device 100 and stored in the memory 130.

If the acquired voice is determined to be actual voice, the processor 190 may perform the authentication procedure according to the received actual voice (S305). After determining that the acquired voice is the actual voice of the user, the processor 190 may unlock the voice interpretation device 100. If desired, the processor 190 also outputs a notification indicating that authentication has been performed using the actual voice through the output unit 170 (S307). In one embodiment, the processor 190 may output a notification indicating that security has been disabled if the authentication procedure is successfully performed using the actual voice. For example, the processor 190 may audibly output the notification through the audio output unit 171. Additionally or alternatively, the processor 190 may display the notification through the display 173. In another embodiment, the processor 190 may audibly output the notification through the audio output unit 171 at the same time that the notification is displayed on the display 173.

Returning back to decision block S303, when determining that the acquired voice is not actual voice, the processor 190 may determine that the acquired voice is synthesized voice and reject authentication (S309).

In one embodiment, the synthesized voice may be generated using a unit-selection method. The unit-selection method is one of a number of voice synthesis methods and refers to a method of selecting voice units as a pronunciation unit from a voice database and connecting the voice units. In another embodiment, the synthesized voice may be generated based on a vocoder feature.

The processor 190 may determine whether or not the acquired voice is synthesized voice using the difference model of the actual voice and the synthesized voice, as will now be described. The processor 190 outputs a notification indicating that the acquired voice is a synthesized voice through the output unit 170 according to the authentication rejection (S311). In one embodiment, the processor 190 may output the notification indicating that the voice subjected to authentication rejection is the synthesized voice through the audio output unit 171 or the display 173. As such, a feature of the method of FIG. 3 prevents or inhibits a security threat due to fake voice. That is, the actual voice of the user may be distinguished from a synthesized voice to enhance security, for example, of the device. Methods for determining whether the acquired voice is an actual voice or a synthesized voice according to the embodiment of the present invention will be described.

Figure 4:
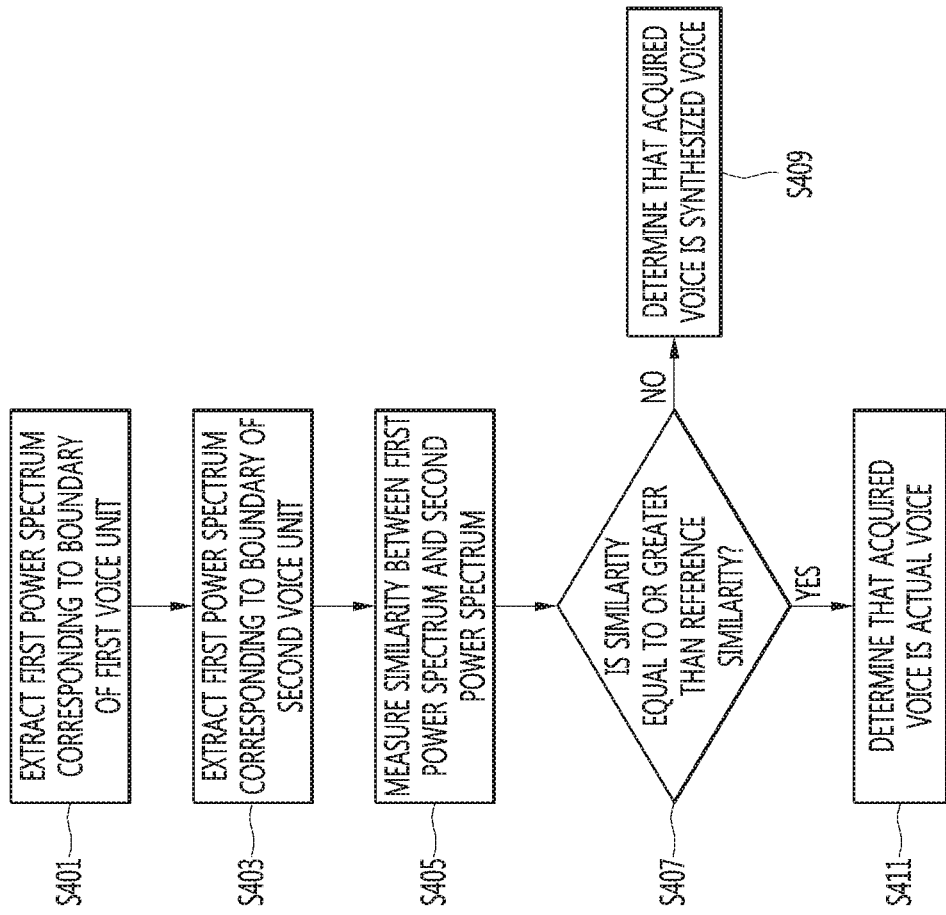
FIG. 4 is a flowchart illustrating a method of determining whether acquired voice is synthesized voice based on unit selection according to an embodiment of the present invention.

FIG. 4 is a flowchart illustrating a method of determining whether acquired voice is synthesized voice based on unit selection according to an embodiment of the present invention. In this figure, the processor 190 extracts a first power spectrum corresponding to the boundary of a first voice unit, which is a unit region, from the acquired voice (S401).

A voice unit may contain voice information corresponding to one character and may include a voice waveform and a power spectrum generated if converting one character into voice. The power spectrum may be a parameter indicating the magnitude of any frequency component included in a time-varying waveform. In one embodiment, the boundary of the first voice unit may be an end part of a time that the first voice unit is formed. That is, the first power spectrum may correspond to a last time slot if the entire power spectrum of the first voice unit is divided into a plurality of time slots having the same time interval.

Next, the processor 190 extracts a second power spectrum corresponding to the boundary of a second voice unit following the first voice unit (S403). In one embodiment, the boundary of the second voice unit is a first part of a time that the second voice unit is formed. That is, the second power spectrum may correspond to a first time slot if the entire power spectrum of the second voice unit is divided into a plurality of time slots having the same time interval.

The processor 190 may then measure for similarity between the first power spectrum and the second power spectrum (S405). For instance, a power spectrum similarity measurement unit may measure the similarity of the power spectrum using a cross-bin method of performing cross-comparison between vector components. The power spectrum similarity measurement unit may also measure the similarity between the first power spectrum and the second power spectrum using a difference between the first frequency band of the first power spectrum and the second frequency band of the second power spectrum and a difference between the size of the first frequency band and the size of the second frequency band.

The processor 190 may then determine whether the measured similarity is equal to or greater than reference similarity (S407). For instance, the processor 190 may determine that the similarity between the first power spectrum and the second power spectrum is less than the reference similarity, if the difference between the first frequency band and the second frequency band is equal to or greater than a predetermined frequency value and the difference in size between the first frequency band and the second frequency band is equal to or greater than a predetermined size.

The processor 190 may also determine that the similarity between the first power spectrum and the second power spectrum is equal to or greater than the reference similarity, if the difference between the first frequency band and the second frequency band is less than the predetermined frequency value and the difference in size between the first frequency band and the second frequency band is less than the predetermined size.

The processor 190 determines that the voice is synthesized voice if the measured similarity is less than the reference similarity (S409), or alternatively determines that the acquired voice is an actual voice (S411).

The processor 190 may determine that the first voice unit and the second voice unit is a combination of synthesized units and determine that voice including the first voice unit and the second voice unit is synthesized voice, if the measured similarity is less than the reference similarity. Thereafter, operations of S309 and S311 of FIG. 3 may be performed.

Figure 5:
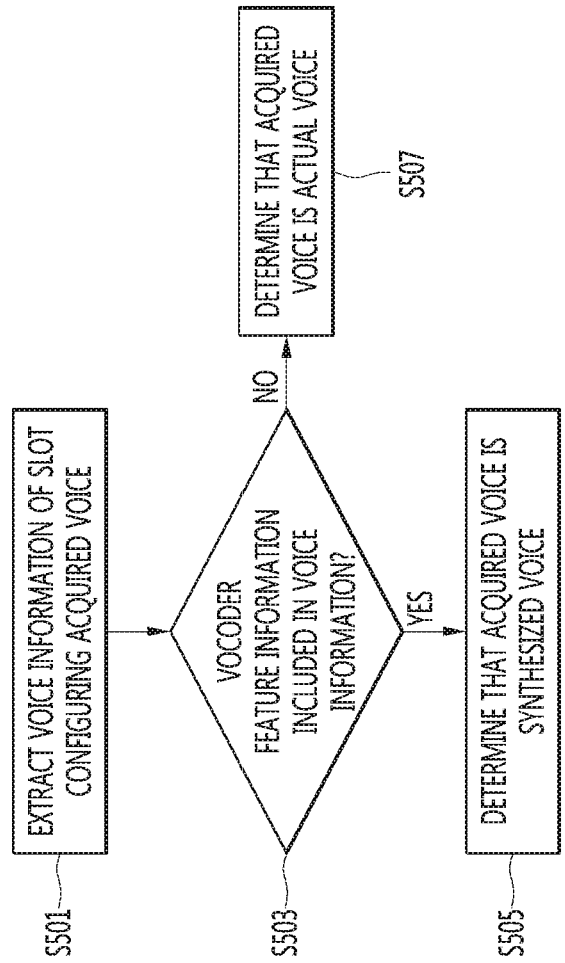
FIG. 5 is a flowchart illustrating a method of determining whether acquired voice is synthesized voice generated based on a vocoder feature according to another embodiment of the present invention.

FIG. 5 is a flowchart illustrating a method of determining whether acquired voice is synthesized voice generated based on a vocoder feature according to another embodiment of the present invention. In this figure, the processor 190 extracts voice information of a time slot configuring voice input to the input unit 120 (S501). The processor 190 may divide the voice waveform and the power spectrum configuring the voice into a plurality of time slots. The processor 190 may extract voice information from each of the plurality of time slots, such as that which is depicted in FIG. 6.

Figure 6:
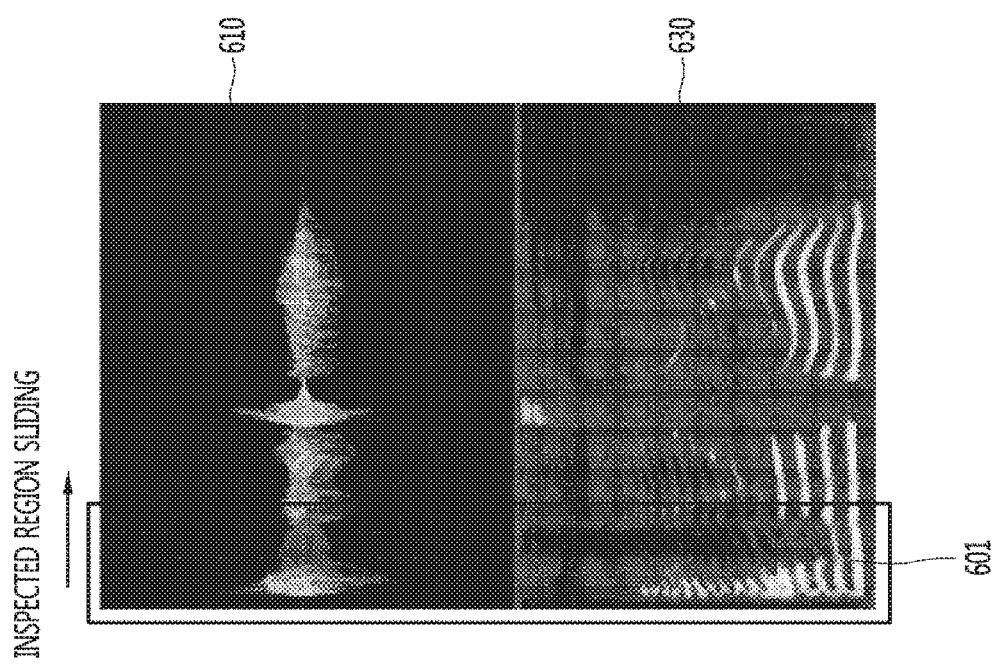
FIG. 6 illustrates a method of extracting voice information of voice input.

FIG. 6 illustrates a method of extracting voice information of voice input. In this figure, the voice input to the input unit 120 may include a voice waveform 610 and a power spectrum 630. A sliding inspection region 601 is shown and the input voice may be divided into a plurality of time slots. The processor 190 may sequentially extract voice information from each of the plurality of time slots. The extracted voice information may include at least one of voiced/unvoiced sound information, a basic period, or a vocal tract coefficient.

Referring back to FIG. 5, the processor 190 determines whether vocoder feature information is included in the extracted voice information (S503). In one embodiment, the vocoder feature information may be information serving as a criterion for determining whether the voice is synthesized voice. The synthesis method based on the vocoder features refers to a method of synthesizing voice based on various parameters using the features of the voice signal. According to the synthesis method based on the vocoder feature, voice sound in which vocal cords vibrate is generated by approximating synthesized pulses using a pulse generator having a period, and irregular unvoiced sound output through narrowed vocal cords is generated by approximating random noise using a random noise generator. An example of the vocoder feature information will be described next with reference to FIG. 7.

FIG. 7 illustrates vocoder feature information according to an embodiment of the present invention. The information on the voice synthesized according to the synthesis method based on the vocoder features may include the vocoder feature information. The vocoder feature information may include at least one of a trace of the same pulse as the synthesized voice in a voiced period, a trace of random noise in an unvoiced period, change in basic phoneme period, or aspect of a vocal tract coefficient, and combinations thereof.

In one embodiment, the processor 190 may determine that the voice is synthesized voice if the voice acquired through the input unit 120 includes any one of four pieces of information, such as that depicted in FIG. 7.

For example, the processor 190 may determine that the voice is synthesized voice, if a synthesized pulse of a voiced period is generated from the voice waveform 610 of the extracted voice information. The processor 190 may also determine that the voice is synthesized voice, if random noise of an unvoiced period is generated from the extracted voice information. In some embodiments, the vocoder feature information may be included in the difference model of the actual voice and the synthesized voice received from the server 200.

Referring back to FIG. 5, the processor 190 determines that the voice is synthesized voice if the vocoder feature information is included in the voice information (S505) In such a scenario, operations S309 and S311 of FIG. 3 may then be performed. Alternatively, the processor 190 determines that the voice is actual voice, if the vocoder feature information is not included in the voice information (S507). In this scenario, operations S305 and S307 of FIG. 3 may then be performed.

Figure 8:
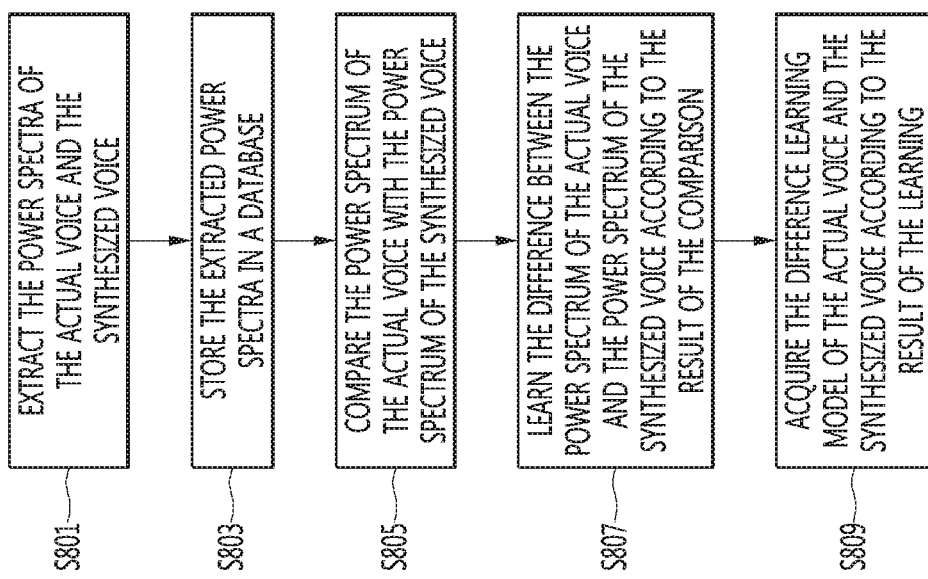
FIG. 8 is a flowchart illustrating a method of acquiring a difference model of actual voice and synthesized voice according to an embodiment of the present invention.

FIG. 8 is a flowchart illustrating a method of acquiring a difference model of actual voice and synthesized voice according to an embodiment of the present invention. Although the process of acquiring the difference model of the actual voice and the synthesized voice is performed by the server 200 in FIG. 8, this is merely exemplary and the process of acquiring the difference model of the actual voice and the synthesized voice may be performed by the processor 190 of the voice interpretation device 100.

Referring to FIG. 8, the server 200 extracts the power spectra of the actual voice and the synthesized voice (S801). In one embodiment, the power spectrum may be a parameter indicating the magnitude of any frequency component included in a time-varying waveform. The server 200 then stores the extracted power spectra in a database (S803). The server 200 compares the power spectrum of the actual voice with the power spectrum of the synthesized voice (S805).

Figure 9:
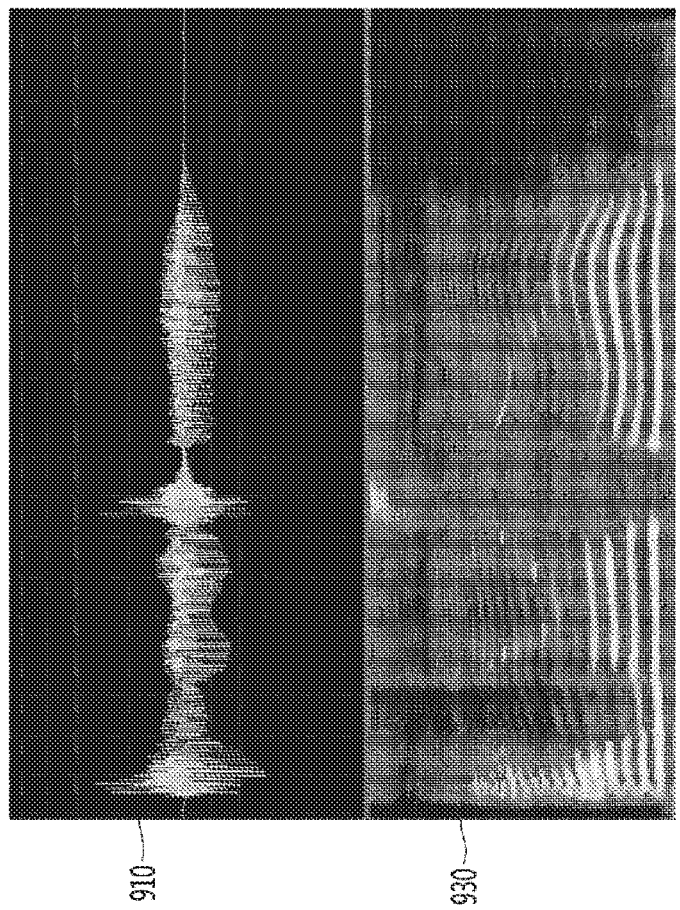
FIG. 9 illustrates a voice waveform and power spectrum corresponding to actual voice of a user.
Figure 10:
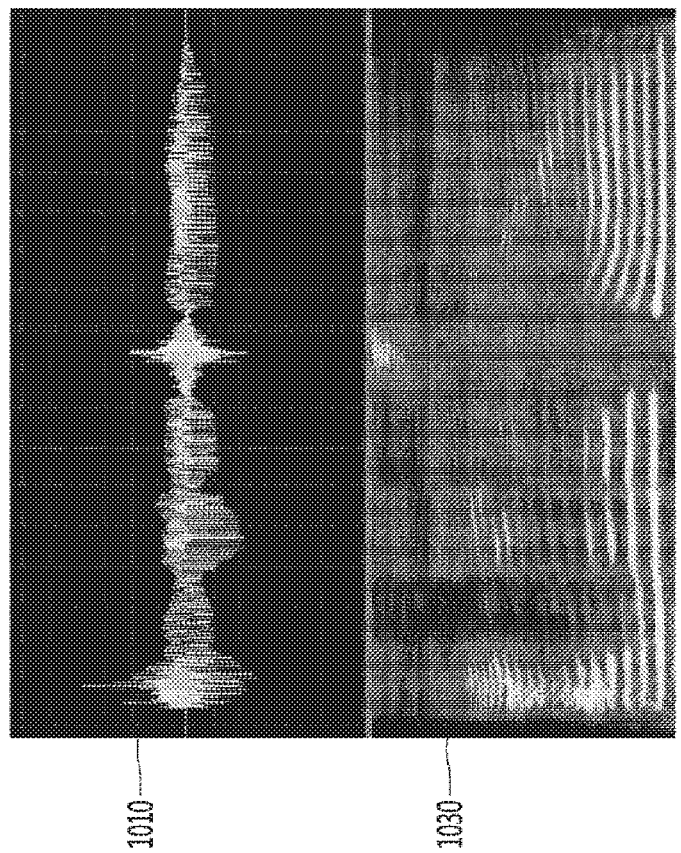
FIG. 10 illustrates a voice waveform and power spectrum of synthesized voice synthesized based on unit selection.

Referring ahead to FIGS. 9 and 10, where FIG. 9 illustrates a voice waveform and power spectrum corresponding to actual voice of a user, and where FIG. 10 illustrates a voice waveform and power spectrum of synthesized voice synthesized based on unit selection. FIGS. 9 and 10 show the waveform and power spectrum of the voice <Hello>.

First, referring to FIG. 9, the first voice waveform 910 and the first power spectrum 930 corresponding to <Hello> as actually uttered by the user are shown. In FIG. 10, the second voice waveform 1010 and the second power spectrum 1030 corresponding to <Hello> as synthesized based on unit selection are shown.

In comparison between FIGS. 9 and 10, it can be seen that the shapes of the first power spectrum corresponding to the actual voice and the second power spectrum corresponding to the synthesized voice are different. This is because the voice <Hello> actually uttered by the user is naturally pronounced one by one, but the voice <Hello> synthesized by unit selection is obtained by selecting and connecting voice units.

Referring back now to FIG. 8, the server 200 learns the difference between the power spectrum of the actual voice and the power spectrum of the synthesized voice according to the result of the comparison (S807). The server 200 then acquires the difference model of the actual voice and the synthesized voice according to the result of learning (S809).

Figure 11:
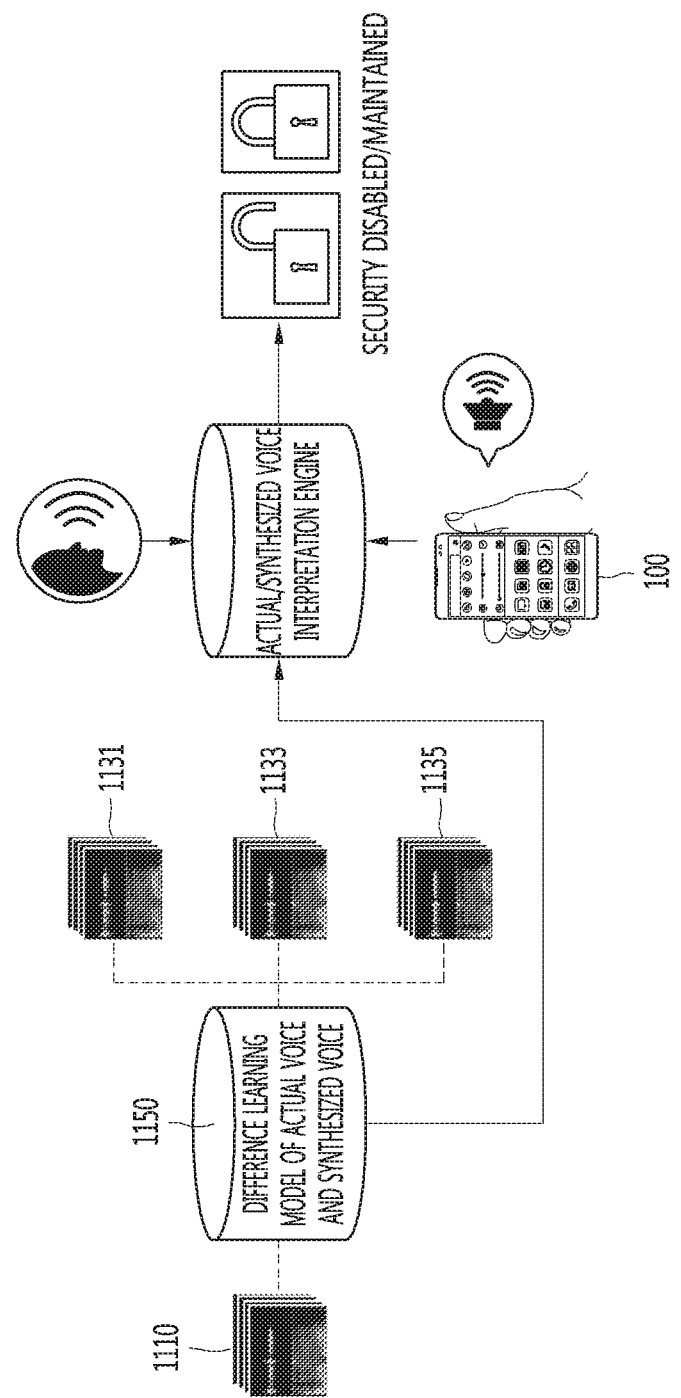
FIG. 11 illustrates a method of determining whether acquired voice is actual voice or synthesized voice using a difference model between the actual voice and synthesized voice, and determining whether security of a voice interpretation device is disabled, according to an embodiment of the present invention.

FIG. 11 illustrates a method of determining whether acquired voice is actual voice or synthesized voice using a difference model between the actual voice and synthesized voice, and determining whether security of a voice interpretation device is disabled, according to an embodiment of the present invention. In this figure, Referring to FIG. 11, a first database 1110 including information related to the actual voice, a second database 1131 including information related to the voice synthesized using the unit selection method, a third database 1133 including information related to the voice synthesized based on the vocoder features and a fourth database 1135 including information related to the voice synthesized based on deep learning, are shown. Each database may be included in the server 200.

The server 200 may compare the data of the first database 1110 with the data of the second to fourth databases 1131 to 1135 and acquire the model 1150 of the difference between the actual voice and the synthesized voice. The model 1150 of the difference between the actual voice and the synthesized voice may include information on the synthesized voice generated based on the unit selection method and information on the synthesized information generated based on the vocoder features.

The voice interpretation engine of the voice interpretation device 100 may determine whether the voice input to the input unit 120 is synthesized voice or actual voice based on the difference model of the actual voice and the synthesized voice. The voice interpretation device 100 performs the authentication procedure if the voice input to the input unit 120 is actual voice. That is, security of the voice interpretation device 100 may be disabled.

The voice interpretation device 100 may output a notification indicating that authentication has been rejected, if the voice input to the input unit 120 is synthesized voice. That is, security of the voice interpretation device 100 may be maintained.

Figure 12:
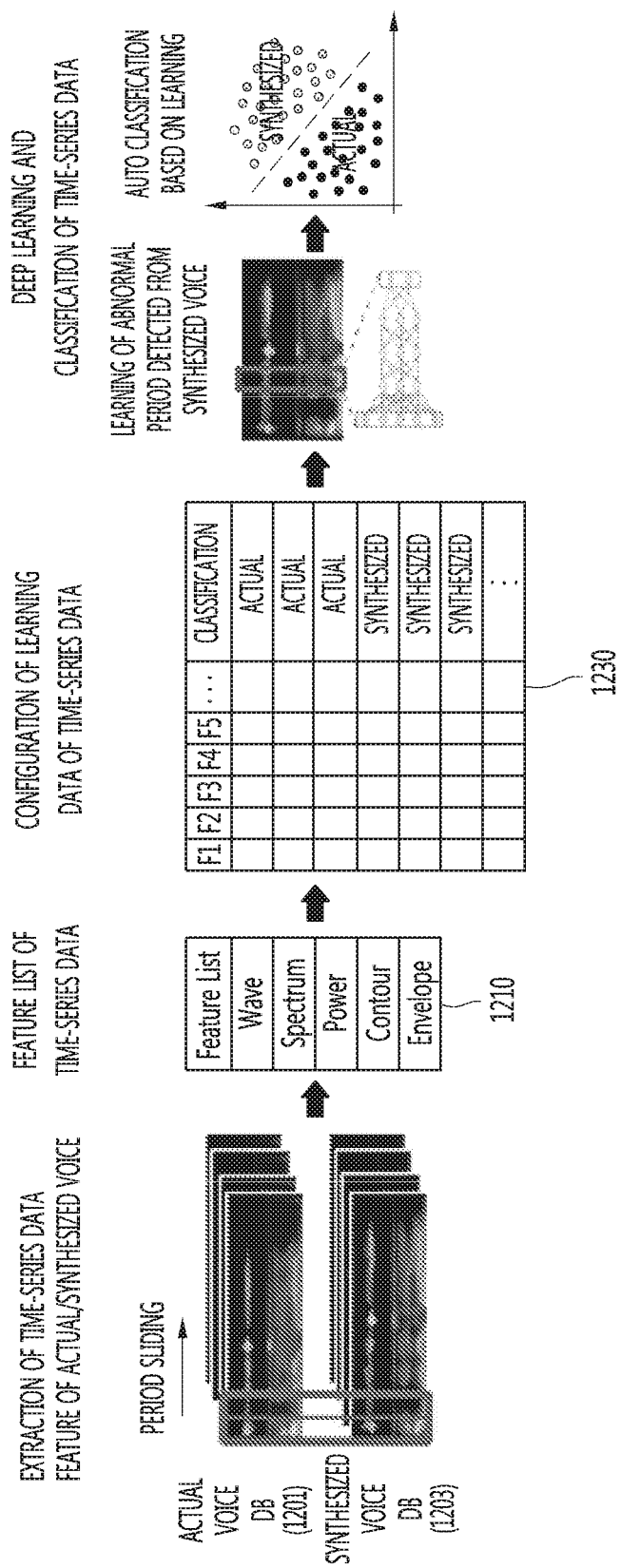
FIG. 12 illustrates an example of classifying actual voice and synthesized voice based on map learning as a machine learning method according to an embodiment of the present invention.

FIG. 12 illustrates an example of classifying actual voice and synthesized voice based on map learning as a machine learning method according to an embodiment of the present invention. In this figure, the server 200 may extract time-series data from the database 1201 for the actual voice and the databases 1203 for the synthesized voice. The time-series data may include any of a wave, a power spectrum, a contour, an envelope of each of the actual voice and the synthesized voice. The envelope may be a graph showing change in amplitude of the voice over time.

Thereafter, the server 200 may generate a feature list 1210 using the time-series feature data and may configure learning data 1230 of the time-series data. The learning data 1230 may be used to distinguish between the actual voice and the synthesized voice using the time-series data. The server 200 may then repeat learning for detecting an abnormal period from the synthesized voice classified through the learning data 1230 using deep learning technology.

In one embodiment, the abnormal period may be a period in which the vocoder features described with reference to FIG. 7 are detected. In another embodiment, the abnormal period may be a period in which the similarity between the power spectra is less than the reference similarity according to the embodiment of FIG. 4.

The server 200 may also automatically classify the actual voice and the synthesized voice by repenting the learning of abnormal period detection.

According to the embodiment of the present invention, it is possible to efficiently distinguish fake voice according to artificial intelligence based voice synthesis and to enhance security of the terminal, by distinguishing between the actual voice of the user and the synthesized voice and rejecting authentication of the synthesized voice.

Various embodiment presented herein may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller of the mobile terminal.

The foregoing embodiments are merely exemplary and are not to be considered as limiting the present disclosure. This description is intended to be illustrative, and not to limit the scope of the claims. Many alternatives, modifications, and variations will be apparent to those skilled in the art. The features, structures, methods, and other feature of the exemplary embodiments described herein may be combined in various ways to obtain additional and/or alternative exemplary embodiments.

What is claimed is:

1. An apparatus, comprising:
a microphone; and
a processor configured to:
receive, via the microphone, audio comprising voice;
extract a first power spectrum corresponding to a first voice unit of the received audio;
extract a second power spectrum corresponding to a second voice unit of the received audio;
obtain similarity between the first power spectrum and the second power spectrum based on a comparison of the first power spectrum with the second power spectrum;
determine that the received audio is a synthesized voice if the obtained similarity is less than a reference value; and
output a first notification indicating that the received audio is the synthesized voice when the received audio is determined to be the synthesized voice.

2. The apparatus of claim 1, wherein the first power spectrum is a last time slot of an entire power spectrum of the first voice unit divided into a plurality of time slots having a same time interval, and
wherein the second power spectrum is a first time slot of the entire power spectrum of the second voice unit divided into a plurality of time slots having a same time interval.

3. The apparatus of claim 2, wherein the processor is further configured to:
determine that the obtained similarity is less than the reference value when a difference between a first frequency band of the first power spectrum and a second frequency band of the second power spectrum is equal to or greater than a defined frequency value, and a difference between a size of the first frequency band and a size of the second frequency band is equal to or greater than a defined size.

4. The apparatus of claim 1, wherein the processor is further configured to:
perform an authentication procedure when the received audio is an actual voice, and not perform the authentication procedure when the received audio is the synthesized voice.

5. The apparatus of claim 1, further comprising:
a speaker configured to audibly output the first notification.

6. The apparatus of claim 1, further comprising:
a display configured to display the first notification or the second notification.

7. The apparatus of claim 1, wherein the processor is further configured to:
output a second notification indicating that the received audio is an actual voice when the received audio is determined to be the actual voice.

8. A method performed at a device having a microphone, the method comprising:
receiving, via the microphone, audio comprising voice;
extracting a first power spectrum corresponding to a first voice unit of the received audio;
extracting a second power spectrum corresponding to a second voice unit of the received audio;

obtaining similarity between the first power spectrum and the second power spectrum based on a comparison of the first power spectrum with the second power spectrum;

determining that the received audio is a synthesized voice if the obtained similarity is less than a reference value; and outputting a first notification indicating that the received audio is the synthesized voice when the received audio is determined to be the synthesized voice.

9. The method of claim 8, wherein the first power spectrum is a last time slot of an entire power spectrum of the first voice unit divided into a plurality of time slots having a same time interval, and wherein the second power spectrum is a first time slot of the entire power spectrum of the second voice unit divided into a plurality of time slots having a same time interval.

10. The method of claim 9, further comprising:

determining that the obtained similarity is less than the reference value when a difference between a first frequency band of the first power spectrum and a second frequency band of the second power spectrum is equal to or greater than a defined frequency value, and a difference between a size of the first frequency band and a size of the second frequency band is equal to or greater than a defined size.

11. The method of claim 8, further comprising:

performing an authentication procedure when the received audio is an actual voice, and not perform the authentication procedure when the received audio is the synthesized voice.

12. The method of claim 8, further comprising:

outputting the first notification via a speaker; and outputting the first notification via a display.

13. The method of claim 8, further comprising:

outputting a second notification indicating that the received audio is an actual voice when the received audio is determined to be the actual voice.

* * * * *